United States Patent [19]

Lange

[11] 4,372,661
[45] Feb. 8, 1983

[54] TENSIONING AND RELEASING ASSEMBLY FOR A CAMERA SHUTTER

[75] Inventor: Karl-Heinz Lange, Bunde, Fed. Rep. of Germany

[73] Assignee: Balda-Werke Photographische Gerate und Kunststoff GmbH & Co., KG, Bunde, Fed. Rep. of Germany

[21] Appl. No.: 298,041

[22] Filed: Aug. 31, 1981

[30] Foreign Application Priority Data

Sep. 2, 1980 [DE] Fed. Rep. of Germany ....... 3032976

[51] Int. Cl.$^3$ ........................ G03B 9/64; G03B 17/42
[52] U.S. Cl. .................... 354/204; 354/237
[58] Field of Search ................ 354/187, 204–207, 354/233, 237, 238, 266, 251

[56] References Cited

U.S. PATENT DOCUMENTS

| | | | |
|---|---|---|---|
| 2,028,752 | 1/1936 | Burger | 354/202 |
| 2,336,396 | 12/1943 | Fischer | 354/187 |
| 4,106,041 | 8/1978 | Lange | 354/204 X |

*Primary Examiner*—John Gonzales
*Attorney, Agent, or Firm*—Blum, Kaplan, Friedman, Silberman & Beran

[57] ABSTRACT

An assembly including a single activation element for tensioning and releasing the tension on a camera shutter is provided. The activating element is an elongated slide displaceable transverse to the axis of the lens having activating surfaces for tensioning the shutter when displaced in a first direction towards the axis of the lens and for releasing the shutter when the lever is displaced in the direction away from the axis of the lens. The slide is displaced towards the lens axis by the film transport and tensions the shutter by pivoting a shutter tension lever in engagement with a shutter ring and locks the shutter ring. The slide is displaced away from the lens axis and unlocks the shutter ring which is biased for opening the shutter. In a further embodiment of the invention, a camera including the assembly also includes a separately activated integrated time-delay release mechanism. Activation of the time release mechanism releases the slide from engagement and permits displacement of the lever after a fixed time to permit release of tension on the shutter. By providing a single activating element which performs both functions, required movements and forces are reduced as well as occupying less space within the interior of the camera. The assembly is particularly well suited for a camera wherein the lens and shutter are displaceable in and out of the camera compartment.

11 Claims, 2 Drawing Figures

TENSIONING AND RELEASING ASSEMBLY FOR A CAMERA SHUTTER

BACKGROUND OF THE INVENTION

This invention relates to a camera shutter assembly, and more particularly to an assembly for tensioning and releasing tension on a camera shutter.

Generally known arrangements for tensioning and releasing a shutter include separate activation elements for tensioning and releasing the shutter. A first activation element tensions the shutter and a second activation element releases the shutter. Tensioning of the shutter may, for example, be effected by means of a slide as described in U.S. Pat. No. 2,751,827, but other types of activation elements may also be used.

Providing the two activation elements, one of which is intended for tensioning the shutter and the other for releasing the shutter, for example the unlocking of the pre-tension shutter, is particularly advantageous in cameras where tensioning and releasing the camera shutter must be effected within the camera compartment. Where this is required, this means providing the two separate assemblies, including transfer bars, linkage and rods. The first such transfer bar transfers the winding-up movement of the shutter, which for example, is derived from the film-drive wheel to the shutter mounted on the lens carrier. The second transfer mechanism transfers the releasing motion from the release button inside the camera compartment to the shutter. The necessity of providing two different transfer mechanisms in the known constructions for transferring the different functions presents several shortcomings. Firstly, these constructions involve considerable expense for engineered parts, and on the other hand, they are increasingly susceptable to mechanical breakdown. Transferring the various movements of the participating element needs to be effected over a multiplicity of levers and joints, which are not only costly to manufacture, but which are also subject to wear and tear.

Accordingly, it would be desirable to provide an assembly for tensioning and releasing the tension on a camera shutter which overcomes these problems in the prior art in such a way that tensioning as well as releasing of the shutter within the camera compartment can be effected with a few, simple transfer elements inside the camera compartment.

SUMMARY OF THE INVENTION

A tensioning and releasing assembly for a camera shutter disposed within the camera compartment is provided. The assembly includes an elongated activating element which is displaced in a direction transverse to the lens axis. The shutter rings are mounted on the lens compartment about the lens axis. The activating element is a slide which includes a first activating face for pivoting a shutter tensioning lever for tensioning (or cocking) the shutter ring when the slide is displaced in a first direction towards the axis of the lens. When the slide is displaced from its tensioned position to a direction away from the axis of the lens, a second activating surface pivots an arresting lever to unlock the shutter from the cocked position permitting its release.

The two activating surfaces on the activating element extend in a direction parallel to the axis of the lens. This makes the assembly particularly well suited for use in a camera wherein the lens is displaced with in and out of the camera compartment along the lens axis. In an exemplary embodiment of the invention, the elongated activating element is a slide extending in a direction perpendicular to the lens axis and which is displaced in this direction with a perpendicular arm extending in a direction parallel to the lens axis for carrying the two activating surfaces. When the slide is displaced towards the lens axis, the first activating surface pivots a shutter tensioning lever in gear engagement with a shutter ring for tensioning the shutter from its release position to a cocked position. When the shutter is in the cocked position an arresting lever locks the shutter in this position until released by activation of the shutter-release assembly. Upon activation of the shutter release button, the slide is displaced in a direction away from the lens axis for pivoting the arresting lever to release the locking engagement with the shutter ring, thereby permitting release of the tensioned shutter. The slide is displaced in the direction towards to the lens axis to cock the shutter by means of a rotating essentric cam mounted on the film transport element.

An independently activated shutter release mechanism integrated with the slide may also be provided. The auxillary shutter release mechanism includes a biased rotating member and a release button which releases the slide from cocked engagement with the shutter release button, the slide mechanically held in position by an electromagnet until a predetermined delay time. Following the delay, the electromagnet is demagnetized to release engagement with the rotating member and the slide is displaced away from the lens axis for releasing the shutter.

Accordingly, it is an object of the invention to provide an improved tensioning and releasing mechanism for a camera shutter.

It is another object of the invention to provide an improved tensioning and releasing assembly for a camera shutter provided within the camera compartment.

It is a further object of the invention to provide an improved tensioning and releasing assembly for a camera shutter for use with a camera wherein the lens is displaceable in and out of the camera body along the lens axis.

Still another object of the invention is to provide an improved tensioning and releasing assembly for a camera shutter including a single displaceable element for tensioning the shutter and for releasing the tension on the shutter.

Still a further object of the invention is to provide an improved tensioning and releasing assembly for a camera shutter utilizing a single element, the single element being displaceable in a direction transverse to the axis of the lens.

Yet another object of the invention is to provide an improved tensioning and releasing assembly for a camera shutter wherein the activating element includes activating surfaces transverse to the direction the activating element is displaced.

Yet a further object of the invention is to provide an improved tensioning and releasing assembly for a camera shutter including a single activating element wherein the activating element is displaced for placing the shutter in a tensioned position by operation of the film transport mechanism.

Still another object of the invention is to provide an auxillary releasing mechanism for releasing the releasing assembly and after a delay time releasing the shutter.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
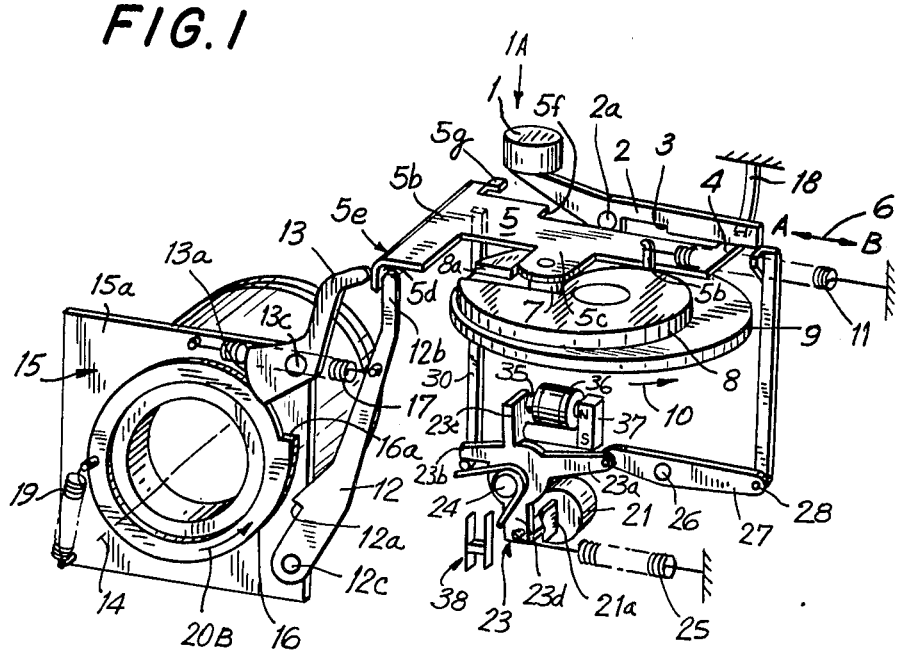
FIG. 1 is perspective view of the tensioning and releasing assembly together with the auxillary time-delay release mechanism for a camera shutter constructed and arranged in accordance with the invention, the elements shown in position before tensioning of the shutter.

The tensioning and releasing assembly for a camera shutter constructed and arranged in accordance with the invention in an at rest or non-tensioned position is shown in the perspective in FIG. 1. A shutter release button 1 is mounted on a release lever 2 which is oscillatably mounted within the camera compartment by a pin 2a. The camera compartment is not illustrated in the figures. Release lever 2 is mounted adjacent to an elongated slide 5 which functions as the single shutter activating element in the assembly for a shutter mounted on a lens compartment 15 about a lens having an axis 4. Slide 5 includes a nose 4 extending in the direction of release lever 2 for engagement thereby and at the opposite end includes a transverse arm 5b. Release lever 2 is formed with a cut-out stop area 3 for receiving nose 4 of slide 5 when slide 5 is placed in a tensioned position in a first direction A indicated on an arrow 6. Thus, slide 5 may be displaced in directions perpendicular to lens axis 14 along arrow 6.

Slide 5 is formed with an arm 5c extending into the camera body transverse to the direction of displacement of slide 5 and includes a rotatably mounted cam roller 7 which rides along an essentric surface 8 of a rotating film transport wheel 9. Wheel 9 is mounted to a film-transport mechanism which is not illustrated herein. When the film transport mechanism is processed for advancing the film, wheel 9 rotates in the direction of an arrow 10 causing cam roller 7 to ride along surface 8 in camming fashion and displaces slide 5 in arrow direction A. Slide 5 is also formed with an upwardly extending arm 5b for mounting a tension spring 11 which is also mounted to the camera wall. Tension spring 11 biases slide 5 in a direction B along arrow 6 away from lens axis 14.

Slide 5 is formed with an activating arm 5b which extends in a direction transverse to the displacement direction of slide 5 and extends parallel to lens axis 14. Activating arm 5b includes a first activation surface 5e formed on the outer surface of activation arm 5b for engaging a shutter tensioning lever 13 at an engagement end 13b. Shutter tensioning lever 13 is mounted by a pin 13c to a wall 15a of lens compartment 15 and is pivoted about pin 13c when engaged by activation surface 5e. Activating arm 5b also includes a second activating surface 5d formed on the inside of activating arm 5b for engaging an arresting lever 12 at a free engagement end 12b. Arresting lever 12 is pivotably mounted by a pin 12c to wall 15a. Activating surfaces 5e and 5d extend parallel to each other and parallel to lens axis 14, and thus, also parallel to the direction of displacement of lens compartment 15 along axis 14.

The shutter is mounted on lens compartment 15 and includes a wind-up ring 16 mounted for rotation about lens axis 14. Wind-up ring 16 includes a tooth region 16b about a portion of its outer circumference. Tooth region 16b cooperates with a tooth segment 13a formed on the operating end of shutter tensioning lever 13.

Figure 2:
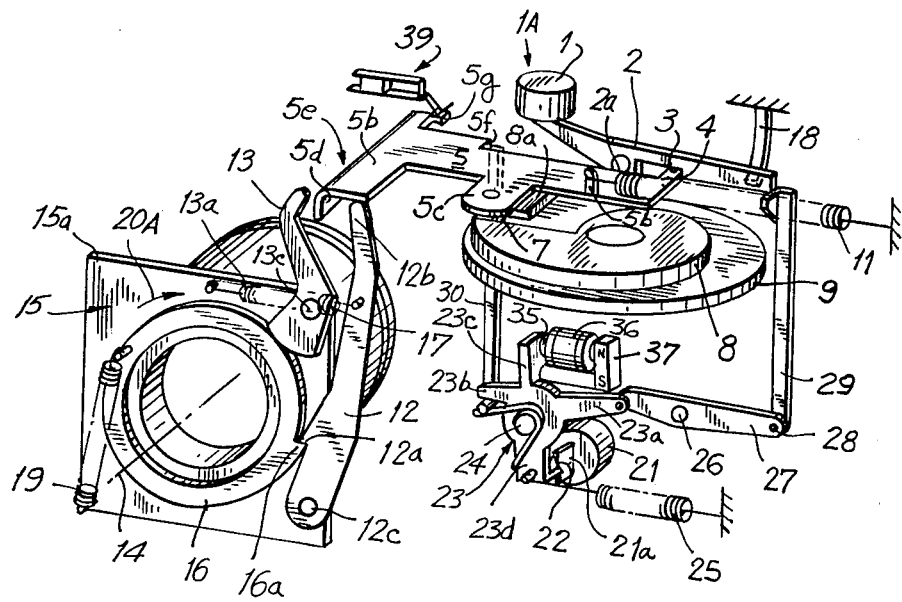
FIG. 2 is a perspective view illustrating the arrangement of elements of FIG. 1 after tensioning of the shutter, but before its release.

Arresting lever 12 is biased towards shutter wind-up ring 16 by a tension spring 17 and includes a nose region 12a for engaging a nose region 16a on shutter wind-up ring 16. Arresting lever 12 does not include any toothed region. Tension spring 17 maintains nose 12a in locking arrangement with nose 16a when the shutter is in a cocked or tensioned position as illustrated in FIG. 2. When the elements are in this position, arresting lever 12 is biased towards lens axis 14 and nose 12a engages 16a of shutter wind-up ring 16 for holding shutter wind-up ring 16 until the shutter is released.

At the time the film transport mechanism is activated, wheel 9 for activating the assembly for tensioning the shutter is turned in arrow direction 10. At this time, cam roller 7 moves along essentric cam surface 8 on wheel 9 which displaces slide 5 from its at rest non-tensioned position of FIG. 1 in the direction of arrow A to the at rest tensioned position illustrated in FIG. 2. In order for cam roller 7 on slide 5 to assume the position in FIG. 2, it must first be displaced about the greatest radial distance of essentric surface 8. At this point, cam roller 7 is displaced in arrow direction B, as it is under tension from spring 11, to fall in position between essentric surface 8 and a stop nut 8a mounted on wheel 9.

Release lever 2 pivotably mounted at pin 2a is under tension in a clockwise direction by a tension spring 18 mounted on the same side of release lever 2 as cut-out stop region 3. Upon displacement of slide 5 from the position illustrated in FIG. 1 along arrow direction A to the tensioned position illustrated in FIG. 2, nose 4 of slide 5 moves along lower surface of release lever 2 and comes to rest behind cut-out stop area 3 of release lever 2. At this time, slide 5 is secured in its tensioned position 2. In this tensioned state, nose 12a of arresting lever 12 is inserted behind nose 16a of shutter winding-up ring 16. Shutter winding-up ring 16 is placed in its tensioned position by being rotated in a direction shown by an arrow 20A as activating surface 5e engages the free activating end 13b of shutter tensioning lever 13. As shutter tensioning lever 13 is pivoted about pin 13c, toothed region 13a engages toothed region 16b on shutter wind-up ring 16 thereby forcing shutter winding-up ring 16 to be rotated in arrow direction 20A. As shutter wind-up ring 16 is biased in the opposite direction illustrated by an arrow 20B by a tension spring 19, shutter wind-up ring 16 places the shutter assembly in a tensioned position. This tensioned position of shutter wind-up ring 16 is maintained by nose 12a of arresting lever 12 engaging nose 16a on shutter wind-up ring 16 as arresting lever 12 is biased in a direction towards lens axis 14 by tension spring 17. Thus, at this time the shutter is under tension and ready to be released.

Upon activation of release button 1 by pressing it in a direction indicated by an arrow 1A, nose 4 of slide 5 is released from engagement by cut-out stop region 3. Slide 5 which is under tension in a direction towards arrow B by tension spring 11 is displaced in arrow direction B. As slide 5 is displaced away from lens axis 14, activating surface 5d on the inner surface of activating arm 5b engages the free activating arm 12b of arresting lever 12 and pivots it in a clockwise direction about pin 12c. As arresting lever 12 is pivoted in a clockwise direction, nose 12a is drawn out of engagement from nose 16a of shutter wind-up ring 16. This release of nose 12a from nose 16a permits shutter wind-up ring 16 to rotate in the counter-clockwise direction of arrow 20b in view of the tension on ring 16 from tension spring 19. This release of shutter wind-up ring 16 and displacement of slide 5 in arrow direction B returns the shutter tensioning and releasing assembly to the unlocked position as illustrated in FIG. 1.

By providing an activating element for performing the double function of tensioning and releasing the tension on a camera shutter in accordance with the invention provides several advantages. Firstly, tensioning of the shutter and releasing of the shutter by the same displaceable element reduces the number of moving parts within the camera compartment as well as reducing the space occupied by various linkages and bars. It also permits construction of the assembly using a smaller number of parts and at reduced cost. These advantages are obtained in accordance with the invention by providing a transfer member which is a tensioning slide that is driven in a direction transverse to the axis of the lens. The transfer element is readily formed with an arm parallel to the lens axis and transverse to the direction of the displacement of the slide. The arm and activating surfaces formed on the arm are parallel to the axis of the lens so that the assembly is particularly well suited for use in a camera wherein the lens and shutter tensioning elements mounted on a lens compartment are displaced into the camera compartment along the axis of the lens.

In addition to releasing the tensioned shutter by operation of release button 1, the tensioning and releasing assembly constructed and arranged in accordance with the invention may be operated by an integrated time-delay release mechanism. The time-delay release mechanism is activated by a special time-delay release key 21. The time-delayed release mechanism includes a star-shaped lever 23 which is rotatably mounted on an axis 24. Star-shaped lever 23 includes a downwardly facing arm 23d having a finger 22 facing time-delay release key 21. Finger 22 is formed with an oblique face which is engaged by a projection 21a formed on time-delay release key 21 so that star lever 23 rotates in a clockwise direction when timedelay release key is depressed. A tension spring 25 biases star lever 23 in the counterclockwise direction in the position illustrated in the figures. Star lever 23 also includes a first horizontally extending arm 23a pivotably coupled to a lever 27 which is oscillatably mounted about a stationary axis 26. Lever 27 is pivotably coupled to an upwardly protruding lever 29 at a connecting joint 28. A parallel upwardly protruding lever 30 is flexibly engaged with a second horizontal arm 23b of star lever 23 through a shank spring 31.

Star lever 23 also includes an upwardly extending arm 23c formed with a magnet anchoring plate 23e. Magnet anchoring plate 23e may be displaced upon rotation of star lever 23 in the clockwise direction by operation of time-delay release key 21 to contact an iron core 35 of a magnetic coil 36. This contact occurs upon depressing time release key 21 in a manner which will be described in more detail below.

Iron core 35 is magnetized by a permanent magnet 37 mounted adjacent to coil 36. Upon pressing time release key 21, projection 21a displaces finger 22 which causes star lever 23 to rotate in a clockwise direction. As star lever 23 rotates in a clockwise direction, magnetic anchoring plate 23e abuts iron core 35 and remains in magnetic contact thereto. At the time that time delay key 21 is depressed, a timing element (which may be formed in any desired construction, but which is not shown in the drawing) is simultaneously activated. The timing element delivers a current pulse to coil 36 after a certain, predetermined delay time. This current pulse when applied to coil 36 leads to neutralization of the magnetic force of iron core 35. As star lever 23 is biased in a counterclockwise direction by tension spring 25, magnetic anchoring plate 23e falls off iron core 35 when it is demagnetized.

The mode of operation of the shutter by the time-delay mechanism may thus be explained by making reference to FIG. 2. Upon depressing time delay key 21 so that magnetic anchoring plate 23e is magnetically engaged by iron core 35, lever 30 is displaced upwardly and is positioned behind a detent 5f on slide 5. At the same time, lever 29 is displaced upwardly by pivoting of lever 27 so that release lever 2 pivots about pin 2a and nose 4 of slide 5 can be displaced below stop region 3 of release lever 2. Thus, as release lever 2 is pivoted, the primary shutter release of slide 5 is released, but as lever 30 engages detent 5f, slide 5 is maintained in its at rest tensioned position towards arrow A and shutter wind-up ring 16 is maintained in its tensioned position.

Following the selected time-delay, and when current pulse is applied to coil 36, so that magnetic anchoring plate 23c is no longer attracted thereto, star lever 23 is rotated in a counter-clockwise direction due to the tension of tension spring 25. As star lever 23 rotates, lever 30 is displaced downwardly and slide 5 is free to be displaced in arrow direction B to the non-tensioned position as illustrated in FIG. 1. As slide 5 is displaced in arrow direction B, arresting lever 12 pivots about pin 12c to release engagement between nose 12a and 16a so that shutter wind-up ring 16 is permitted to rotate in arrow direction 20B under force of tension spring 19 and release the shutter.

Accordingly, by providing the time delay mechanism including a star lever as described, the tensioning and releasing assembly for a camera shutter constructed and arranged in accordance with the invention including a single displaceable activated element, can be utilized with an auxillary time-delay shutter releasing mechanism. The double function of the activating element in combination with the time delay release mechanism provides for a simplified construction in a reduced space within the camera compartment.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An assembly for tensioning a camera shutter in a camera having a lens and shutter assembly moveable along the axis of the camera lens, comprising:
   shutter activation means including a tensioning slide mounted within the camera body for selective displacement in a first direction and an opposed second direction transverse to the axis of the lens;
   tensioning means mounted within the camera body for tensioning the shutter in response to displacement of the activation means in a tensioning direction; and
   locking means mounted within the camera body and operatively engaged to the shutter assembly for holding the shutter in a tensioned position and for releasing the shutter in response to displacement of the activation means in a direction opposite to the tensioning direction.

2. The assembly of claim 1, wherein said tensioning slide includes a first engagement surface for engaging the tensioning means and second engagement surface for engaging the locking means and releasing engagement with the shutter when said slide is displaced in the second direction, each said first and second engagement surface extending parallel to the axis of the lens and said slide biased towards said second direction.

3. The assembly of claim 2, wherein the tensioning slide includes an arm extending in a direction parallel to the axis of the lens, said arm including the first and second engagement surfaces for engaging the tensioning means and locking means, respectively.

4. The assembly of claim 2, further including a wheel having an rotary axis substantially perpendicular to the axis of the lens, said wheel including a cam, said tensioning slide including a cam follower in contact with said cam for displacing said slide in a direction substantially perpendicular to the rotary axis of said wheel and substantially perpendicular to the axis of the lens.

5. The assembly of claim 4, further including a film take-up assembly, said wheel operatively engaged to said film take-up assembly.

6. The assembly of claim 2, wherein the shutter includes a shutter wind-up ring rotatable about the axis of the lens, said wind-up ring biased in a direction opposite to the tensioning direction and the shutter tensioning means is a reciprocating lever operatively engaged with said shutter wind-up ring, said shutter tensioning means rotating said shutter wind-up ring in response to displacement of the tensioning slide.

7. The assembly of claims 2 or 6, wherein said shutter locking means is a reciprocating lever biased towards said shutter wind-up ring for engaging said shutter wind-up ring when said wind-up ring is in a tensioned position, said locking lever releasing engagement with said shutter wind-up ring in response to displacement of said tensioning slide in the second direction.

8. The assembly of claim 7, wherein said first tensioning direction of displacement of said tensioning slide is towards the axis of the lens and the second direction of the tensioning slide is a direction away from the axis of the lens.

9. The assembly of claim 8, further including a pivotable shutter release lever and a shutter release button mounted thereon, said shutter release lever formed with a stop area for engaging said tensioning slide and maintaining the position of said tensioning slide after displacement in its first direction for tensioning said shutter assembly, said shutter release lever releasing engagement with said tensioning slide in response to displacement of said shutter release button for releasing said tensioning slide from the position in its first direction for displacement in its second direction for releasing the tension on the shutter assembly.

10. The assembly of claim 9, further including auxillary shutter release means selectively operatively engaged with said activation element, said auxilliary release means for releasing said shutter release lever from engagement with the activation element and the tension on said shutter after a predetermined period of time after activation.

11. The assembly of claim 9, further including auxilliary shutter release means selectively operatively engaged to said tensioning slide and including electromagnetic means and selectively actuatable lever means, said selectively actuatable lever means including linkage means for releasing the shutter release lever from engagement with the tensioning slide and restraining said slide in the tensioned position and said selectively actuatable lever means engaged by said electromagnetic means in response to activation of said selectively actuatable lever means, said electromagnetic means subject to demagnetization following a predetermined period of time following activation of said auxilliary shutter release means and selectively actuatable lever means, said selectively actuatable lever means releasing engagement with said tensioning slide for pivoting said locking means for releasing engagement with said shutter wind-up ring following said predetermined time for operating the shutter.

* * * * *